United States Patent
Fragola

(10) Patent No.: US 6,889,059 B1
(45) Date of Patent: May 3, 2005

(54) MULTI-CARD DEVICE FOR TELECOMMUNICATIONS, AND PROCESS FOR AUTOMATICALLY MANAGING TELEPHONE COMMUNICATIONS

(75) Inventor: Felice Fragola, Quargnento (IT)

(73) Assignee: Guala Dispensing S.p.A., Spinetta Marengo (IT)

(*) Notice: Subject to any disclaimer, the term of this patent is extended or adjusted under 35 U.S.C. 154(b) by 361 days.

(21) Appl. No.: 10/129,271

(22) PCT Filed: Oct. 26, 2000

(86) PCT No.: PCT/EP00/10567
§ 371 (c)(1),
(2), (4) Date: May 3, 2002

(87) PCT Pub. No.: WO01/33880
PCT Pub. Date: May 10, 2001

(30) Foreign Application Priority Data

Nov. 3, 1999 (EP) .......................................... 99830691

(51) Int. Cl.[7] .............................. H04B 1/38; H04M 1/00
(52) U.S. Cl. ....................... 455/558; 455/559; 455/433; 455/432; 455/411; 455/406; 455/407; 455/564; 455/566; 455/419; 379/114.2; 379/114.17; 379/114.26; 379/114.28
(58) Field of Search ................................ 455/558, 559, 455/432, 433, 411, 406, 407, 566, 564; 379/114.28

(56) References Cited

U.S. PATENT DOCUMENTS

| | | | |
|---|---|---|---|
| 5,764,730 A | 6/1998 | Rabe et al. | |
| 5,778,322 A * | 7/1998 | Rydbeck | 455/558 |
| 5,845,205 A * | 12/1998 | Alanara et al. | 455/564 |
| 5,903,845 A | 5/1999 | Buhrmann et al. | |
| 5,915,226 A * | 6/1999 | Martineau | 455/558 |
| 5,933,785 A * | 8/1999 | Tayloe | 455/558 |
| 5,979,771 A * | 11/1999 | Adams et al. | 235/486 |
| 5,987,325 A * | 11/1999 | Tayloe | 455/435.2 |
| 5,999,811 A * | 12/1999 | Molne | 455/432.3 |
| 6,052,604 A * | 4/2000 | Bishop et al. | 455/558 |
| 6,062,887 A * | 5/2000 | Schuster et al. | 439/218 |
| 6,119,020 A * | 9/2000 | Miller et al. | 455/558 |
| 6,141,563 A * | 10/2000 | Miller et al. | 455/558 |
| 6,141,564 A * | 10/2000 | Bruner et al. | 455/558 |
| 6,623,305 B2 * | 9/2003 | Chun-Lung | 439/630 |

FOREIGN PATENT DOCUMENTS

| | | |
|---|---|---|
| EP | 0 586 081 | 3/1994 |
| WO | 99 41921 | 8/1999 |

* cited by examiner

Primary Examiner—Marceau Milord
(74) Attorney, Agent, or Firm—Oblon, Spivak, McClelland, Maier & Neustadt, P.C.

(57) ABSTRACT

A multi-card cellular telephone apparatus includes a central processing unit and a plurality of SIM cards connected to the central processing unit through slots. The plurality of SIM cards are selectively managed by the central processing unit employing an active time agenda that allows reading of an internal clock time and activating the SIM cards as a function of the assigned time range. A process is also disclosed for automatically managing multiple SIM cards.

14 Claims, 4 Drawing Sheets

MULTI-CARD DEVICE FOR TELECOMMUNICATIONS, AND PROCESS FOR AUTOMATICALLY MANAGING TELEPHONE COMMUNICATIONS

The present invention refers to a telecommunications device adapted to operate with a plurality of cards, and in particular to a cellular telephone apparatus equipped with a plurality of cards of the "SIM card" type. The invention further refers to a process for automatically managing multiple telephone communication items in a telephone device, in particular multiple SIMs in a cellular telephone device.

The cellular telephone apparata are known in the art and their very widespreaded growing diffusion occurred simultaneously with their technologic development so that they are enabled to perform an increasing and more and more sophisticated number of functions.

Another parallel growth was the one of the providers of cellular telephone services, both at national and international level, and at local level. Nowadays users have to deal with a high number of providers of connections and services, in order to be connected to which it is necessary to purchase suitable customized telephone cards containing, first of all, the phone number assigned to the provider's user. In case a user wishes to change the type of providers according to the type of phone call that he wishes to make, to the type of time range in which such phone call occurs, or due to other reasons, he has to turn off his own cellular phone, remove the previous provider's card and insert the new card; then, he has to turn on again his phone, possibly keying-in access key-words and make the phone call. If it is necessary to carry out such operations frequently, this can become very disturbing and cumbersome to realize. Moreover, when there are different providers offering different time rate conditions according to the period in which the phone call occurs, it is not at all practical to proceed with continuous manual replacements of cards and remember the most favourable time rate situation according to the period.

Object of the present invention is solving the above prior-art problems, by providing a multi-card device, in particular a cellular telephone apparatus for telecommunications that contains therein a plurality of telephone cards with which it is able to selectively operate, upon the operator's choice or in a completely automatized way according to the time of the day in which the phone call occurs, without having every time to place the involved card inside the cellular phone.

A further object of the present invention is providing a process for automatically managing multiple telephone communication items that allows exploiting a device of the above-described type in order to manage a plurality of communication providers or carriers in general, and a plurality of SIMs in particular.

The present invention will be described with reference to cellular telephone apparata, but obviously people skilled in the art will understand that it can be applied to any device that is suitable to operate with different types of cards, by inserting them inside the device itself. Similarly, the present invention describes a process for managing a plurality of SIMs, since these are the current technological way of performing cellular communications, but the process of the invention can be equally applied to any type of communication involving the management of multiple items or members.

The above and other objects and advantages of the invention, as will appear from the following description, are obtained by a multi-card device as claimed in claim 1 and by a process as claimed in claim 8. Preferred embodiments and non-trivial variations of the present invention are claimed in the dependent claims.

The present invention will be better described by some preferred embodiments thereof, given as a non-limiting example, with reference to the enclosed drawings, in which.

Figure 1:
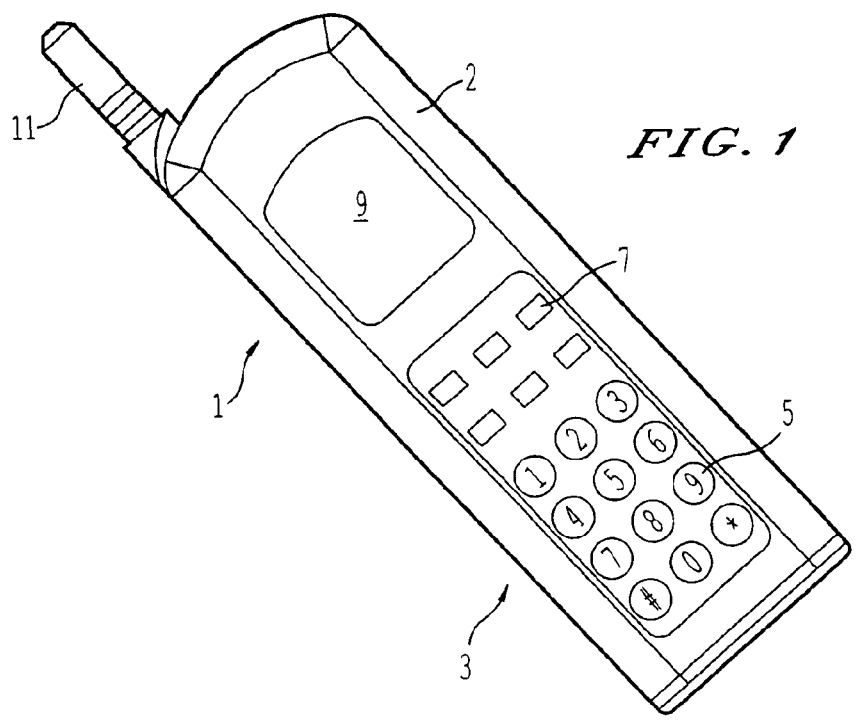
FIG. 1 is a front perspective view of an embodiment of the multi-card device according to the present invention applied to a cellular telephone apparatus.
Figure 2:
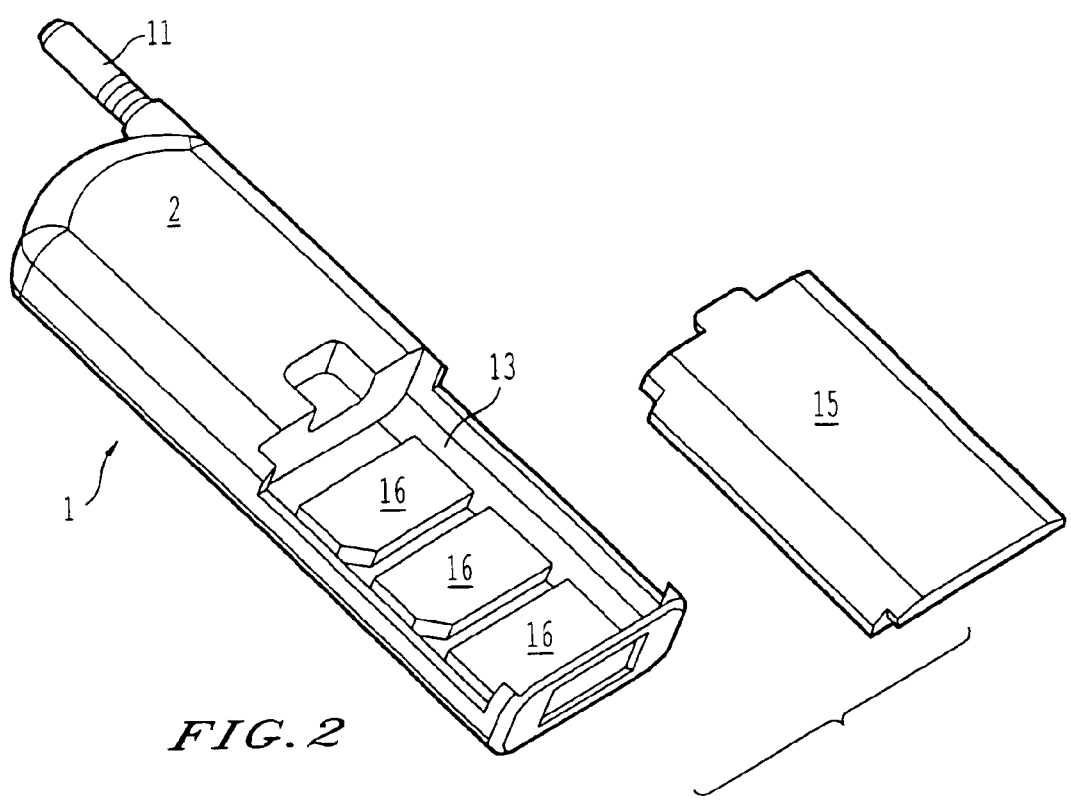
FIG. 2 is a rear perspective view of the cellular telephone apparatus in FIG. 1.

With reference to FIGS. 1 and 2, the multi-card device of the invention is shown in its preferred embodiment, that is the one of a cellular telephone apparatus (hereinbelow briefly called "cellular phone") 1 of a known type, composed of a support body 2 that can be manually grasped. Such support body 2 is equipped with a keypad 3 containing numeric keys 5 to dial telephone numbers and functional keys 7 that perform various functions, among which turning the cellular phone 1 on and off, etc. The cellular phone 1 is then equipped, in a known way, with a display 9 and a communication antenna 11 of the fixed or removable type. As better appears from FIG. 2, the cellular phone 1, preferably in its rear part, is equipped with a recess 13, adapted to be covered by a suitable cover 15, inside which there are a plurality (in FIG. 2 there are 3 being shown) of housings (the so-called "slots") 16 each one adapted to contain a card (not shown), in this case of the telephonic type, of a provider of various types of telephone services. Such cards are usually of the intelligent type, that is they are equipped with a microprocessor (not shown) adapted to perform a certain number of functions pre-set by the provider itself: such cards are commonly known with the name of "SIM (Subscriber Identity Module) cards" and as such they will be referred to hereinbelow in the present description.

The cellular phone 1 hereby summarizingly described, since it is known in the art, is equipped inside with an integrated circuit board (not shown) comprising a central processing unit (or CPU) suitable, in addition to performing the common functions for which such cellular phone 1 is adapted and that are known in the art, also to carry out the simultaneous and parallel management of the above SIM cards housed in slots 16. Such management is configurated in a set of procedures, that are respectively shown in FIGS. 3 to 5 and that will be described in detail below.

Figure 3:
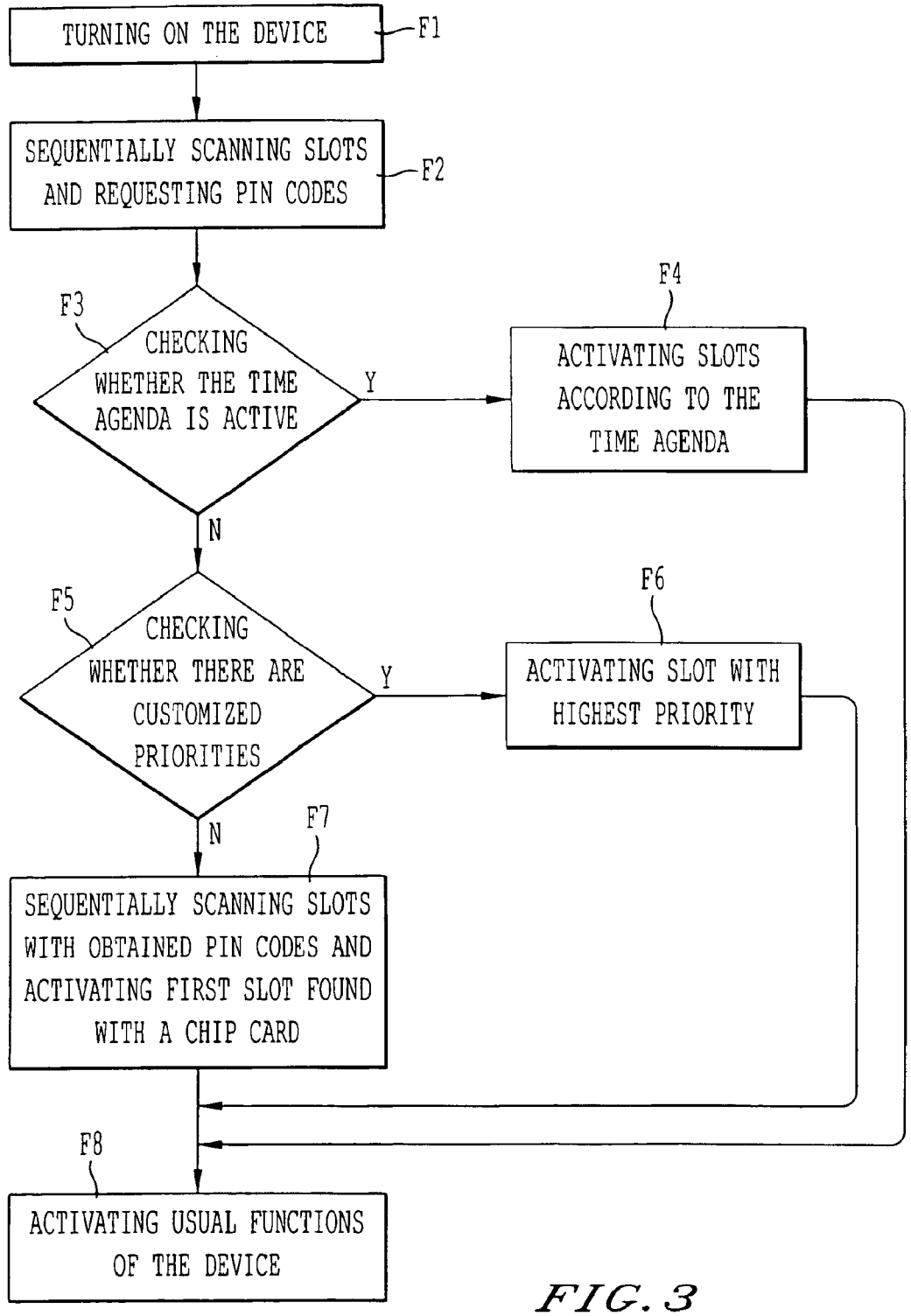
FIG. 3 is a flow diagram of a turning-on and first operation process of the device of the invention.

In particular, FIG. 3 is a flow diagram of a turning-on and first operation process of the device 1 of the invention.

The automatic activation process for SIM cards at turning-on includes the steps of:

turning on (F1) the device 1;

should a specific management routing be missing, sequentially scanning (F2) slots 16 and requesting a PIN (Personal Identification Number) code for every detected SIM card, operation that all SIM cards owners must perform to activate their own cards;

checking (F3) whether the time agenda (that will be described afterwards) is active, and in a positive case reading (F4) the internal clock time and activating slots 16 as function of the time range assigned in the time agenda itself;

checking (F5) whether there are customized priorities for slots 16, and in a positive case activating (F6) the slot 16 whose priority is highest;

sequentially scanning (F7) slots 16 with the obtained PIN code and activating the first slot being found with a chip card; and activating (F8) the usual functions of the device 1 (for example the normal functions of the cellular phone 1) with the first activated slot.

The management process of slots and cards activities in the device 1 of the invention will now be described with reference to the flow diagram in FIG. 4.

Figure 4:
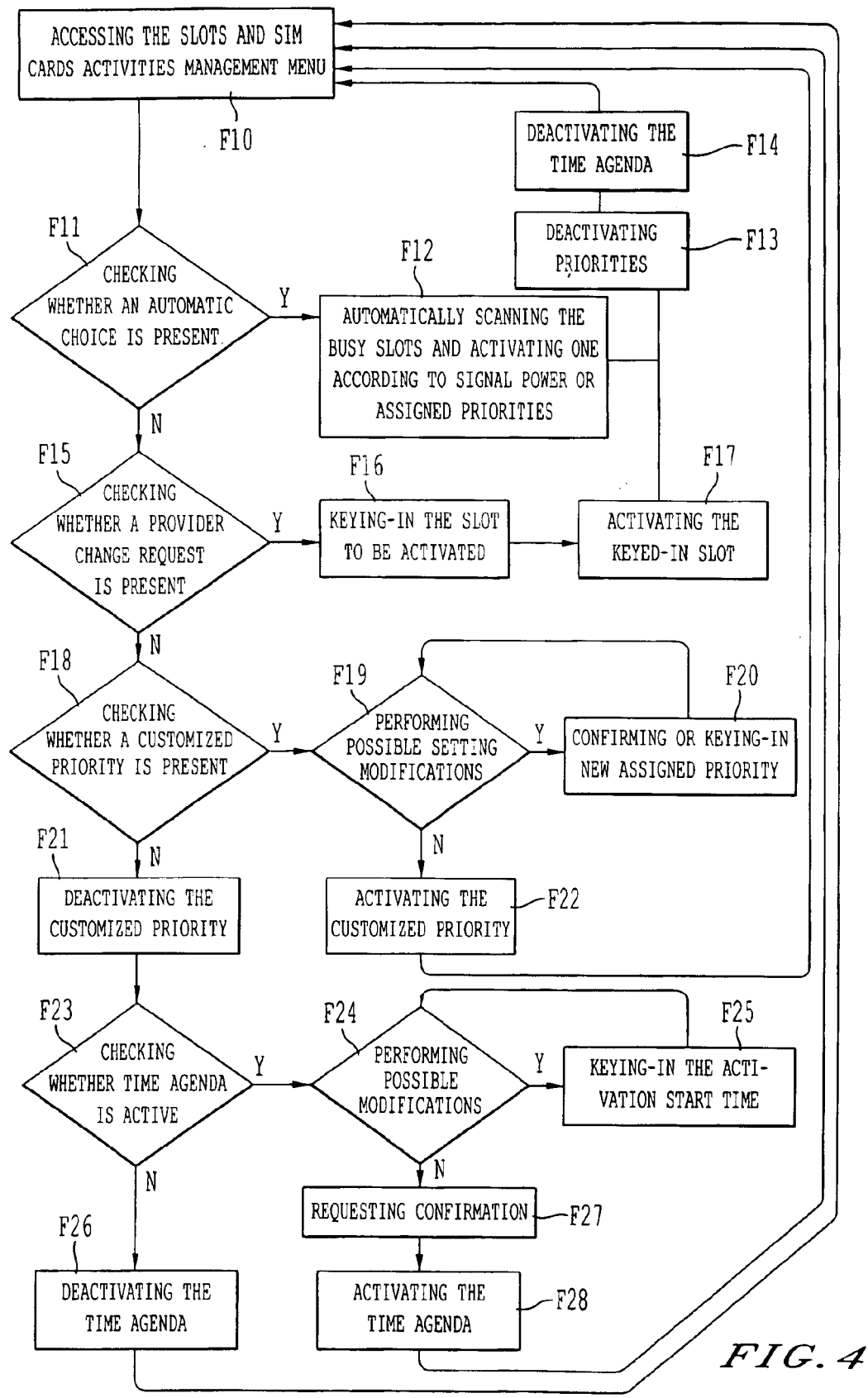
FIG. 4 is a flow diagram of the management process for slots and cards activities in the device of the invention.

The management process for parallel activities in slots 16 and SIM cards in FIG. 4 comprises the steps of:

accessing (F10) the slots and SIM cards activities management menu;

if an automatic choice is present (F11), automatically scanning (F12) the busy slots 16, and choosing and activating the slots 16 as function of signal power, in case of conflict applying the priorities assigned to slots 16 (in a customized way or by default); then, deactivating (F13) the priority of slots 16 and deactivating (F14) the time agenda, going back to the starting menu (F10);

should an automatic choice be absent (F11), checking (F15) whether the current provider variation is requested;

in case of a request to change the current provider (F15), keying-in (F16) the slot 16 position to be activated independently from the assigned priorities, activating (F17) the keyed-in slot 16, deactivating (F13) the slots 16 priority and deactivating (F14) the time agenda, going then back to the menu (F10);

in case of lack of a variation request for the current provider (F15), checking (F18) the existence of a customized priority for slots 16;

if a customized priority is present for slots 16 (F18), performing possible setting modifications (F19) (for example, after having keyed-in the slot number, confirming or keying-in the new assigned priority (F20)) and activating (F22) the customized priority for slots 16, going then back to the starting menu (F10);

in case of lack of a customized priority for slots 16 (F18), deactivating the customized priority for slots 16;

checking (F23) the activation of the automatic time agenda;

in case of lack of activation of the automatic time agenda (F23), deactivating the time agenda (F26) and going back to the starting menu (F10);

in case of activation of the automatic time agenda (F23), performing possible modifications (F24) (for example, after having keyed-in the slot number, confirming or keying-in the activation start time (F25)) and activating (F28) the time agenda, finally going back to the starting menu (F10).

In addition to these steps, before activating the time agenda (F28), a step (F27) for a confirmation request before activating a new slot 16 can be provided, possibly emitting a sound signal if the activation is of the automatic type.

Finally the time management of an automatic activation agenda for the device 1 of the invention will now be described with reference to the flow diagram in FIG. 5.

Figure 5:
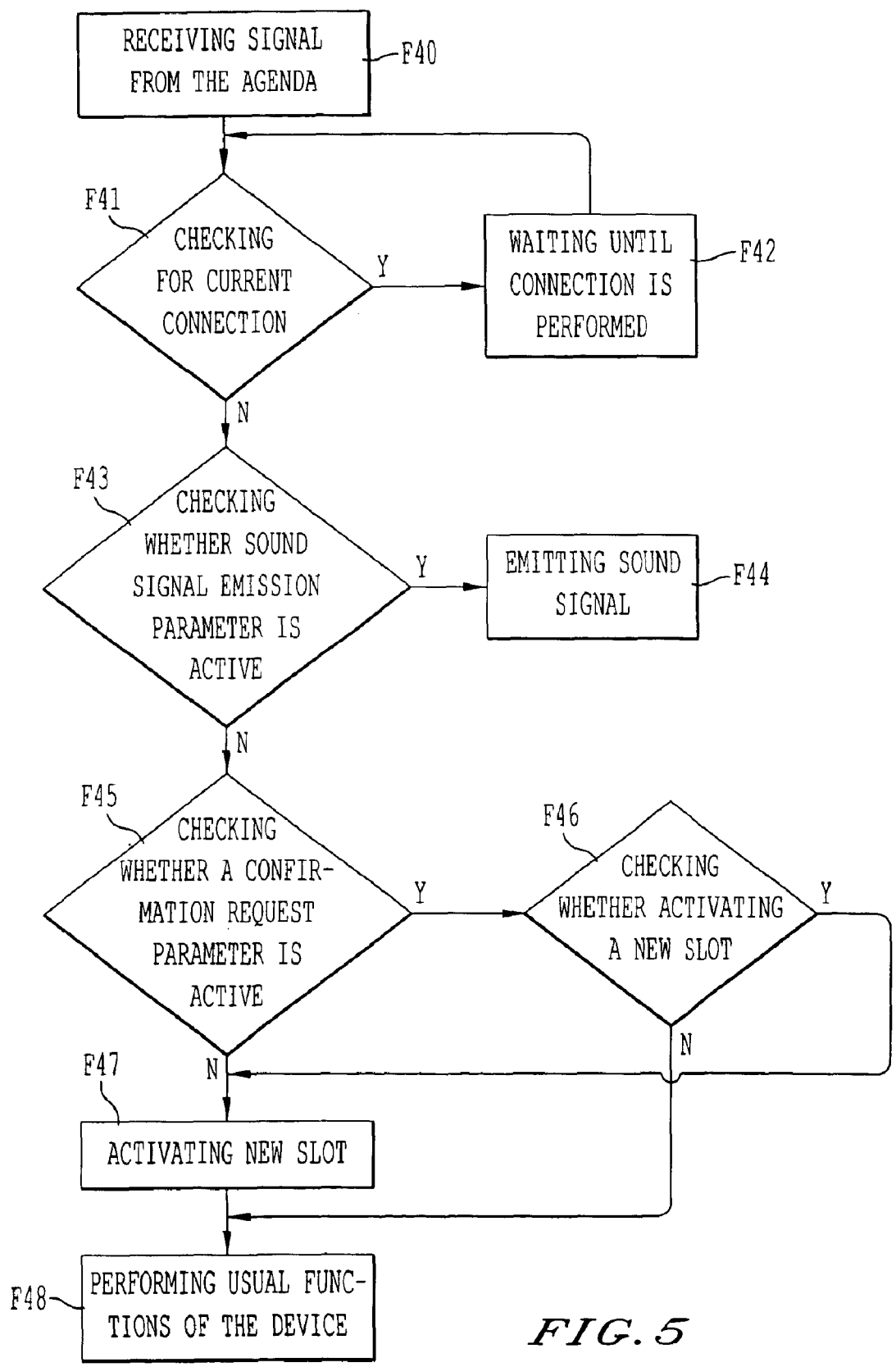
FIG. 5 is a block diagram of the time management process of an automatically-activated agenda for the device of the invention.

Scope of the automatic activation process of the slots 16 according to time information in FIG. 5 is making a time agenda active that operates under the same principle of electronic agendas. In fact, an "alarm" signal is provided at the pre-fixed time, which triggers the activation miniprocedure of the programmed slot 16.

A variation increasing the potentialities of such agenda provides adding the day-of-the-week parameter.

Hereinbelow an example is shown about a cellular phone 1 on which two SIM cards are installed, one of which is of the company type or anyway linked to the professional activity (Slot 1), while the other one of which is of the personal type (Slot 2). A programming example of the time agenda as function of these two SIM cards is shown in the following Table 1.

TABLE 1

|  | Activation time | | | | |
| --- | --- | --- | --- | --- | --- |
|  | Slot 1 | Slot 2 | Slot 3 | ... | Slot n |
| Monday | 8.30 | 18.30 | n.a. | ... | n.a. |
| Tuesday | 8.30 | 18.30 | n.a. | ... | n.a. |
| Wednesday | 8.30 | 18.30 | n.a. | ... | n.a. |
| Thursday | 8.30 | 18.30 | n.a. | ... | n.a. |
| Friday | 8.30 | 18.30 | n.a. | ... | n.a. |
| Saturday | 8.30 | 12.30 | n.a. | ... | n.a. |
| Sunday | --:-- | --:-- | n.a. | ... | n.a. |

As clearly appears from the above Table, in any case the personal card (Slot 2) will remain active from Saturday at 0:30 p.m. to Monday at 8:29 a.m.

The process in FIG. 5 comprises the steps of:

receiving (F40) a signal from the agenda, where such signal comprises for example day of the week and time;

checking (F41) the presence of a current connection and, in case of lack of connection, waiting (F42) till the connection is performed;

checking (F43) whether a sound signal emission parameter is active and emitting (F44) the sound signal if the result is positive;

checking (F45) whether a confirmation request parameter is active, and if the result is negative activating (F47) a new slot 16;

in case the confirmation request parameter is active, checking (F46) whether activating a new slot 16 and activating (F47) the new slot 16 if the result is positive;

performing (F48) the usual functions of the device 1, like for example the usual functions of a cellular phone 1.

The above-described cellular phone 1 also allows, in a non-limiting way, performing a process for automatically managing telephone communications that is another characteristic of the present invention, and that will be described below in detail. The inventive process allows automatically managing telephone communications in a telephone device, in particular cellular telephone communications in a cellular telephone device that is able to manage a plurality of SIMs; the process comprises the steps of:

sequentially scanning for the presence of SIMs in this device and requesting a PIN code for every detected SIM;

optionally scanning at international roaming level for the presence of local SIMs in the device and requesting a PIN code for every detected local SIM;

in case a local SIM at international roaming level is present, activating this local SIM and activating usual functions of the device with the activated local SIM;

in case a local SIM at international roaming level is not present, activating the first detected SIM and activating usual functions of the device with this activated SIM;

checking for the presence of an active time agenda in the device; and in case an active time agenda is present, reading an internal clock time and activating every detected SIM as function of a time range assigned to the SIM.

The above-mentioned process can further comprise, when a telephone call is made from the device, the steps of:

recognising a provider from an identification code (for example, the prefix) of the number of the call being made; and if a SIM belonging to the recognised provider is present in the device, activating this SIM for the call.

The above steps of optionally scanning and recognising are performed only if an enabling control flag therefor is set for this purpose in the device.

The inventive process can further comprise a parallel activities management process for the SIMs, where this parallel activities management process comprises the steps of:

accessing a SIM activities management menu;

if an automatic choice is present, automatically scanning the detected SIMs, and choosing and activating the SIMs as function of signal power, in case of conflict applying the priorities assigned to the SIMs, deactivating the priority of the SIMs and deactivating the time agenda;

should an automatic choice be absent, checking whether the current provider variation is requested;

in case of a request to change the current provider, keying-in the SIM to be activated independently from assigned priorities, activating the keyed-in SIM, deactivating the priority of the SIMs and deactivating the time agenda;

in case of lack of a variation request for the current provider, checking the existence of a customized priority for the SIMs;

if a customized priority is present for the SIMs, performing possible setting modifications and activating the customized priority for the SIMs;

in case of lack of a customized priority for the SIMs, deactivating the customized priority for the SIMs;

checking the activation of the automatic time agenda;

in case of lack of activation of the automatic time agenda, deactivating the time agenda;

in case of activation of the automatic time agenda, performing possible modifications and activating the time agenda.

Moreover, the inventive process can comprise, before the activating step of the time agenda, the step of activation confirmation requesting for a new slot and emmitting a sound signal if this is an automatic activation, and can further comprise an automatic activation process for the SIMs according to time information.

In particular, this automatic activation process of the SIMs according to time information comprises the steps of:

receiving a signal from the agenda;

checking the presence of a current connection and, in case of lack of connection, waiting till the connection is performed;

checking whether a sound signal emission parameter is active and emitting the sound signal if the result is positive;

checking whether a confirmation request parameter is active, and if the result is negative-activating a new SIM;

in case the confirmation request parameter is active, checking whether activating a new SIM and activating the new SIM if the result is positive;

performing the usual functions of the device.

What is claimed is:

1. Multi-card device for telecommunications, comprising:

a central processing unit;

a plurality of SIM cards connected to said central processing unit and selectively managed by said central processing unit;

a plurality of slots configured to house said plurality of SIM cards;

displaying means and key input means, respectively to display and choose operating functions to be activated;

wherein said central processing unit is configured to perform an automatic activation process for said SIM cards upon turning-on, said automatic activation process of said SIM cards upon turning-on including:

turning on said device;

sequentially first scanning said slots and requesting a PIN code for every detected SIM card;

sequentially second scanning said slots with the obtained PIN code and activating a first slot found with a chip card; and activating usual functions of said device with said first activated slot; and further including, after said first scanning:

checking for a presence of an active time agenda; and in a case an active time agenda is present, reading an internal clock time and activating the slots as function of an assigned time range.

2. Multi-card device according to claim 1, wherein said process further comprises, after said first scanning:

checking for a presence of customized priorities for said slots; and in a case of detecting the presence of customized priorities for said slots, activating the slot whose priority is highest.

3. Multi-card device according to claim 1, wherein said central processing unit is further configured to perform a parallel activities management process for said slots and said SIM cards.

4. Multi-card device according to claim 3, wherein said parallel activities management process for said slots and said SIM cards includes:

accessing the slots and a SIM cards activities management menu;

if an automatic choice is present, automatically scanning busy slots, and choosing and activating said slots as a function of signal power, in a case of conflict applying the priorities assigned to said slots, deactivating the priority of said slots, and deactivating the active time agenda;

if an automatic choice is absent, checking whether a current provider variation is requested;

in a case of a request to change the current provider, keying-in the slot position to be activated independently from assigned priorities, activating the keyed-in slot, deactivating the priority of said slots, and deactivating the active time agenda;

in a case of a lack of a variation request for the current provider, checking for an existence of a customized priority for said slots;

if a customized priority is present for said slots, performing possible setting modifications and activating the customized priority for said slots;

in a case of a lack of a customized priority for said slots, deactivating the customized priority for said slots;

checking the activation of the active time agenda;

in a case of a lack of activation of the active time agenda, deactivating the active time agenda;

in a case of an activation of the active time agenda, performing possible modifications and activating the active time agenda.

5. Multi-card device according to claim 4, further comprising:

before the activating of the active time agenda, activation confirmation requesting for a new slot and emitting a sound signal if this is an automatic activation.

6. Multi-card device according to claim 1, wherein said central processing unit is further configured to perform an automatic activation process for said slots according to time information.

7. Multi-card device according to claim 6, wherein said automatic activation process of said slots according to time information includes:

receiving a signal from the active time agenda;

checking for a presence of a current connection and, in a case of a lack of the current connection, waiting until the current connection is performed;

checking whether a sound signal emission parameter is active and emitting a sound signal if the sound signal emission parameter is active;

checking whether a confirmation request parameter is active, and if the confirmation request parameter is not active activating a new slot;

in a case the confirmation request parameter is active, checking whether activating a new slot and activating the new slot if a result is positive;

performing usual functions of said device.

8. Process for automatically managing multiple telephone communication items in a telephone device, comprising:

sequentially scanning for a presence of SIMs in said device and requesting a PIN code for every detected SIM;

optionally scanning at an international roaming level for a presence of local SIMs in said device and requesting a PIN code for every detected local SIM;

in a case a local SIM at the international roaming level is present, activating said local SIM and activating usual functions of said device with said activated local SIM;

in a case a local SIM at the international roaming level is not present, activating the first detected SIM and activating usual functions of said device with said activated SIM;

checking for a presence of an active time agenda in said device; and in a case an active time agenda is present, reading an internal clock time and activating every detected SIM as a function of a time range assigned to said SIM.

9. Process according to claim 8, further comprising, when a telephone call is made from said device:

recognizing a provider from an identification code of a number of the telephone call being made; and if a SIM belonging to the recognized provider is present in said device, activating said SIM for the call.

10. Process according to claim 8, wherein said optionally scanning and recognizing are performed if an enabling control flag therefor is set.

11. Process according to claim 8, further comprising a parallel activities management process for said SIMs, said parallel activities management process comprising:

accessing a SIM activities management menu;

if an automatic choice is present, automatically scanning the detected SIMs, and choosing and activating said SIMs as a function of signal power, in a case of a conflict applying priorities assigned to said SIMs, deactivating the priorities of said SIMs, and deactivating the active time agenda;

should an automatic choice be absent, checking whether a current provider variation is requested;

in a case of a request to change the current provider, keying-in the SIM to be activated independently from assigned priorities, activating the keyed-in SIM, deactivating the priority of said SIMs, and deactivating the active time agenda;

in a case of a lack of a variation request for the current provider, checking for an existence of a customized priority for said SIMs;

if a customized priority is present for said SIMs, performing possible setting modifications and activating the customized priority for said SIMs;

in a case of a lack of a customized priority for said SIMs, deactivating the customized priority for said SIMs;

checking for an activation of the active time agenda;

in a case of a lack of activation of the active time agenda, deactivating the active time agenda;

in a case of activation of the active time agenda, performing possible modifications and activating the active time agenda.

12. Process according to claim 11, further comprising, before the activating of the active time agenda, activation confirmation requesting for a new slot and emitting a sound signal if this is an automatic activation.

13. Process according to claim 8, further comprising an automatic activation process for said SIMs according to time information.

14. Process according to claim 13, wherein said automatic activation process of said SIMs according to time information comprises:

receiving a signal from the active time agenda;

checking for a presence of a current connection and, in a case of a lack of the current connection, waiting until the current connection is performed;

checking whether a sound signal emission parameter is active and emitting the sound signal if the sound signal emission parameter is active;

checking whether a confirmation request parameter is active, and if the confirmation request parameter is not active activating a new SIM;

in a case the confirmation request parameter is active, checking whether activating a new SIM and activating the new SIM if a result is positive;

performing usual functions of said device.

* * * * *